United States Patent [19]

Dorr et al.

[11] 4,273,212
[45] Jun. 16, 1981

[54] OIL AND GAS WELL KICK DETECTOR

[75] Inventors: John A. Dorr; Matt Nomm, both of Annapolis, Md.

[73] Assignee: Westinghouse Electric Corp., Pittsburgh, Pa.

[21] Appl. No.: 6,832

[22] Filed: Jan. 26, 1979

[51] Int. Cl.³ .............................................. G01V 1/40
[52] U.S. Cl. ................................, 181/102; 181/106; 367/83; 367/908; 73/151; 175/40; 175/48
[58] Field of Search ..................... 367/83, 86, 25, 908; 166/250; 175/1, 40, 48; 73/151; 181/102, 106

[56] References Cited

U.S. PATENT DOCUMENTS

| | | | |
|---|---|---|---|
| 2,232,476 | 2/1941 | Rutzmann . | |
| 2,560,911 | 7/1951 | Wolf . | |
| 2,573,390 | 10/1951 | Blanchard . | |
| 3,100,023 | 8/1963 | Clements | 367/908 |
| 3,100,994 | 8/1963 | Junger . | |
| 3,208,349 | 9/1965 | Burnett et al. . | |
| 3,316,997 | 5/1967 | McCoy . | |
| 3,760,891 | 9/1973 | Gadbous | 175/48 |
| 3,821,726 | 6/1974 | Chang et al. | 175/48 |
| 3,865,201 | 2/1975 | Haden | 175/50 |
| 3,900,827 | 8/1975 | Lamel et al. | 175/50 |
| 3,906,435 | 9/1975 | Lamel et al. | 175/50 |
| 3,910,110 | 10/1975 | Jefferies et al. | 175/48 |
| 3,961,308 | 6/1976 | Parker | 175/48 |
| 4,147,222 | 4/1979 | Patten et al. | 175/48 |

Primary Examiner—Howard A. Birmiel
Attorney, Agent, or Firm—D. Schron

[57] ABSTRACT

Acoustic signals are propagated through the drilling fluid in a well being drilled and reflected acoustic energy from the vicinity of the bottom of the well is displayed, as well as reflections from any kicking medium so as to give advance warning of a possible blow-out.

7 Claims, 4 Drawing Figures

OIL AND GAS WELL KICK DETECTOR

BACKGROUND OF THE INVENTION

1. Field of the Invention:

The invention in general relates to the drilling of oil or gas wells, and particularly to the acoustic detection of a kick.

2. Description of the Prior Art:

In the drilling of an oil or gas well, drilling fluid referred to in the industry as "mud", is pumped into the drill pipe where it proceeds out through the drill bit and up the annular space between the drill pipe and the walls of the hole and further up the annular space between the drill pipe and the casing generally used, after which it is examined at the surface for certain parameters, processed and returned to circulation. The purpose of the circulating mud is to clean, cool and lubricate the bit, flush to the surface the cuttings from the bore hole and to protect the walls of the hole until casing is inserted. The density of the mud is carefully controlled at the surface so as to contain various pressures encountered in the hole.

As the well is drilled, gases or high pressure fluids may be released from porous rock and find their way into the circulating mud. This may result in a modification of the buoyancy of the drilling string and can cause extensive damage if it goes undetected. This gas or liquid influx reduces the hydrostatic head in the annulus and is known as a kick. If the volume of the kick is not excessive and if it can be detected, procedures may be instituted so that drilling operations may proceed with minimal disruption.

An uncontrolled kick is called a blowout, which have been known to cause extensive equipment damage, fires, and possible release of noxious gases. Accordingly, some means of detecting the initial kick is desired.

The present invention provides such need and utilizes acoustic methods.

Acoustic methods have been utilized for years in the oil and gas well production area. For example, after the completion of a well, the depth of fluid standing in the well is desired to be known because such information is helpful in proper setting and operation of pumps used in the wells. In order to determine the height of the standing fluid in the well, many systems transmit an acoustic pulse from the top of the casing, in the annular spacing between the casing and the tubing. The sound pulse travels down the well and is reflected back up from the fluid-air interface to provide an indication of fluid level.

During the drilling of some wells, apparatus is utilized which transmits acoustic signals down the drill pipe itself for telemetry and control purposes.

Schemes for acoustically monitoring for kicks include the examination at the surface of the circulating mud by acoustically monitoring mud flow rates or by examining acoustic attenuation of signals propagated through the mud.

In yet another detector, an acoustic transmitter of low frequency is placed on the casing, or the like, to laterally displace any bubbles which might be contained in the circulating mud. A higher frequency Doppler detection system is then operable to detect the relatively displaced bubbles.

The present invention provides a relatively simple means providing an early indication of a kick to permit immediate action to be taken to prevent catastrophic results or to achieve quick return to normal drilling operations. Further, the apparatus may also provide a record of drilling rate.

SUMMARY OF THE INVENTION

The kick detection apparatus of the present invention is utilized during the drilling of a well wherein the drilling operations makes use of a drill pipe extending down through a larger diameter conduit and wherein the drilling fluid is circulated down the drill pipe and up the annulus around the drill pipe. Transducer means are connected to the conduit in a manner to be in acoustic communication with the drilling fluid in the annulus. Means are provided for energizing the transducer means so as to propagate acoustic signals through the drilling fluid down the annulus. Receiver means are positioned so as to receive reflected acoustic energy propagated back through the drilling fluid and the received signals are provided to a display means which displays the reflection of acoustic energy from the vicinity of the bottom of the hole being drilled and for displaying the reflection of acoustic energy from the interface between the drilling fluid and a kicking medium.

DESCRIPTION OF THE DRAWINGS

In the figures, none of which are to scale, like parts have been given the same reference numerals.

FIG. 4 is a view of one type of display means which may be utilized herein.

DESCRIPTION OF THE PREFERRED EMBODIMENT

Figure 1:
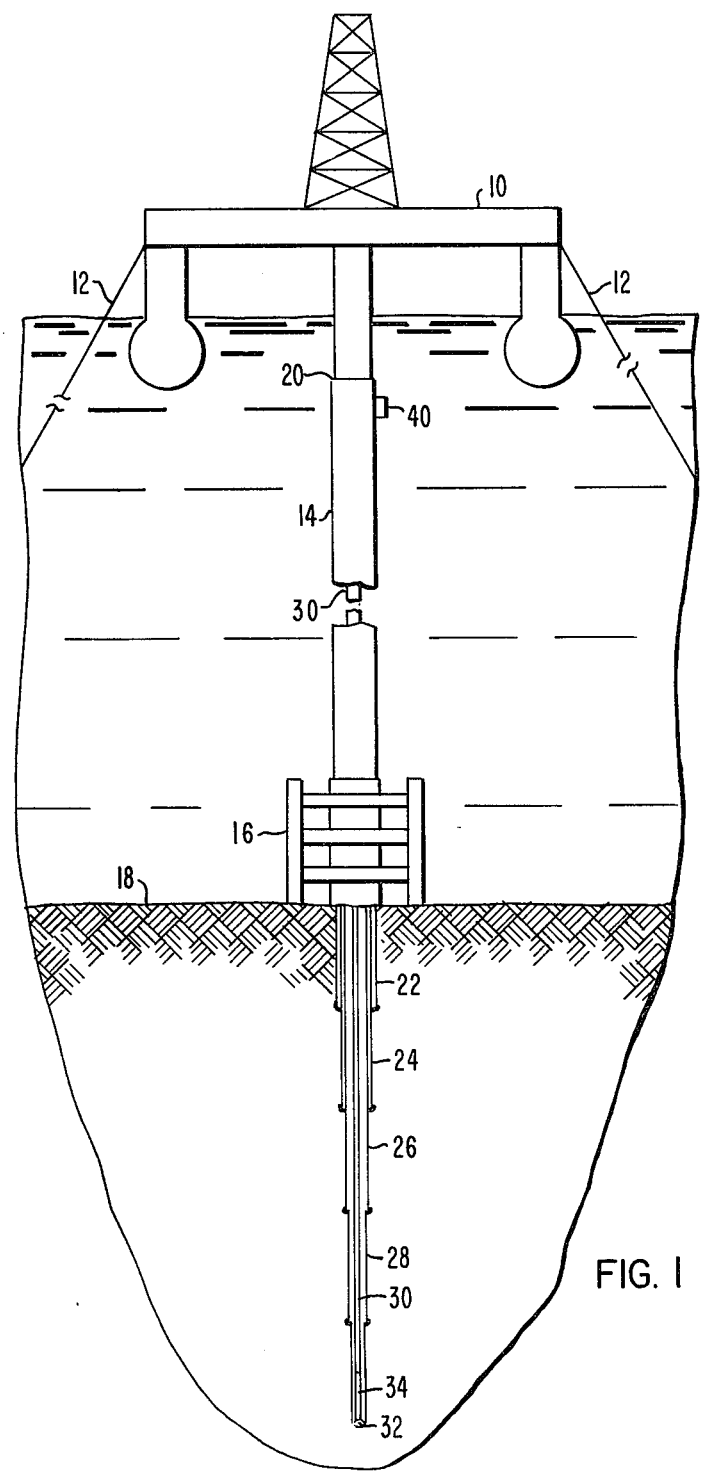
FIG. 1 is a schematic view of an off-shore drilling operation.

The present invention can be utilized in conjunction with various drilling operations; it will, however, be particularly described with respect to an off-shore drilling operation, such as illustrated in FIG. 1. A semisubmersible drilling vessel 10 is kept on-station, such as by anchor lines 12 and has a relatively large diameter conduit in the form of marine riser 14 extending down to a blowout preventer 16 on the bed 18 of a body of water, and at the top of a well being drilled. To accommodate for vertical movements of the vessel 10, the marine riser 14 includes a slip joint 20.

The well being drilled includes a plurality of casings, such as conductor 22, surface casing 24, intermediate casing 26 and a liner string 28 connected at the lower portion of intermediate casing 26.

Drill pipe 30 extends down into the well and has at its lower end thereof drilling bit 32 on top of which is disposed drill collar 34. Acoustic transducer means 40 is positioned on the riser 14 so as to project acoustic energy down toward the bottom of the well, through the medium of the drilling fluid. For convenience, transducer means 40 is positioned below slip joint 20 so that reflection times will not be affected by the heaving of the vessel 10.

Figure 2:
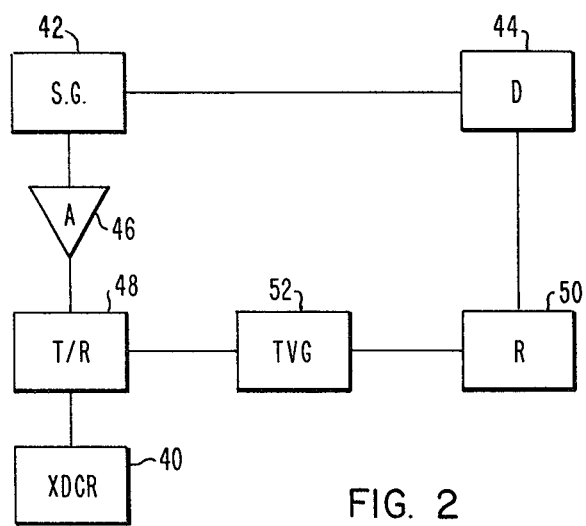
FIG. 2 is a block diagram of one embodiment of the present invention.

FIG. 2 illustrating a block diagram of the components of the system includes a signal generator 42 operable to supply a signal to transducer means 40 when commanded by a signal from the display 44. The signal provided by generator 42 is amplified in amplifier 46 and supplied to the transducer means 40 through a transmit and receive (T/R) switch 48. The acoustic signal generated by transducer means 40 may be of several varieties, a pulsed CW signal being preferred.

Reflected acoustic energy is received by receiver transducer means which may be the same transducer means 40 and supplied to a receiver 50 by way of T/R switch 48 and a time varying gain amplifier 52, as is commonly done in the sonar signal processing art. The return signals are processed by receiver 50 and then are supplied to the display 44 where they may be interpreted. In a preferred embodiment, display 44 is a graphic recorder which utilizes a stylus which sweeps downward across chart paper in synchronism with the propagating acoustic wave while the chart paper moves slowly along a perpendicular axis thereto to provide a time record.

Figure 3:
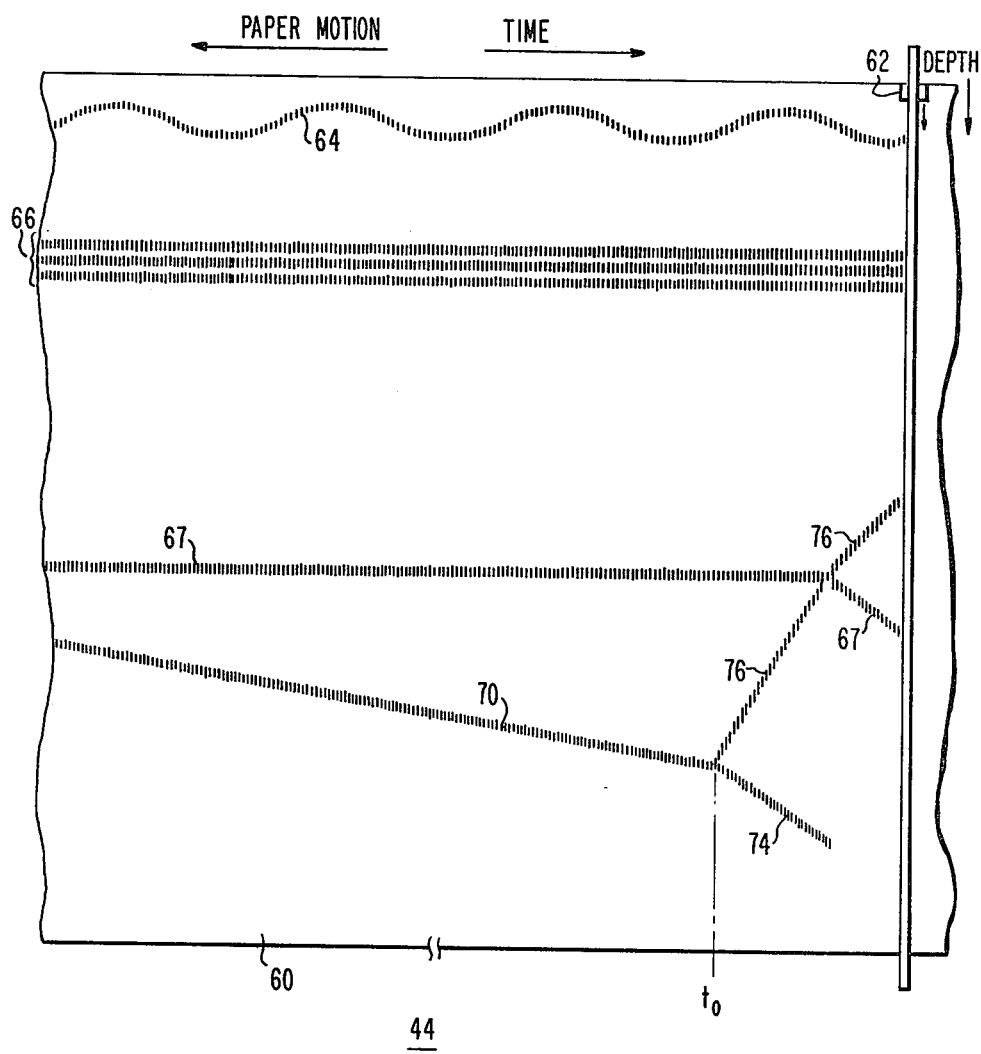
FIG. 3 is a view of one type of display means which may be utilized herein.

FIG. 3 illustrates a typical display.

As the chart paper 60 moves in the direction indicated, stylus 62 moves downwardly and will mark on the chart paper to indicate certain acoustic reflections. Since the acoustic energy also propagates up the riser as well as down the riser, and due to the proximity of the transducer means relative to the slip joint, the first acoustic reflection will be from the top of the telescoping joint and will be a measure of the heave of the platform. The recording of this reflection is indicated by the undulating curve 64.

Those acoustic reflectors which are fixed in depth relative to the transducer means will appear as horizontal traces on the record, such as indicated by traces 66 illustrating the reflections from the BOP 16 and trace 67 illustrating the relection from the joint between casings 26 and 28.

Sloping trace 70 is indicative of the drilling rate of the hole which progressively increases in depth, with time. Depending upon the equipment utilized, and the depth of the well, trace 70 may indicate the acoustic reflection from the drill bit at the bottom of the hole, or in the greater instance of cases, would represent the reflection from the top of the drill collar bearing down on the drill bit and maintaining the drill pipe in tension. With the drill collar having a diameter close to that of the bore hole, any acoustic energy propagating down to the bottom of the hole in all probability would either be attenuated or would show up very close to trace 70. In either event, therefore, considering the distance of the transducer means to the bottom of the hole relative to the distance from the top of the drill collar to the bottom of the hole, trace 70 represents the reflection of acoustic energy from the vicinity of the bottom.

Let it be assumed that at time t0 a gas kick occurs so that there is an influx of gas into the drilling fluid. At this time, trace 70 will deviate from its normal slope. As the drill enters this kick area, there is a marked increase in the rate of penetration known as a drilling break. This situation is indicated by trace 74. Due to the presence of the gas, there is a change in acoustic velocity which also contributes to the sloping trace 74. Trace 74 additionally is seen to terminate; and this is due to the fact that the gas bubbles attenuate the acoustic energy so as to cause any reflected acoustic energy to have such a low intensity as to be imperceptible.

Trace 76 occurring after t0 represents the acoustic reflection from the rising gas. When the rising gas reaches the level of the joint, trace 76 will change its slope due to the fact that the vertical velocity in the annulus above the joint decreases upon introduction into the increased area. Tracing 67 representing the joint between casings will also change its slope and will be attenuated or terminated as was the case with tracing 74 due to the presence of the acoustic energy absorbing gas between it and the transducer means. The displayed information therefore is an excellent indication of a kick and further provides information relative to drilling rate.

Figure 4:
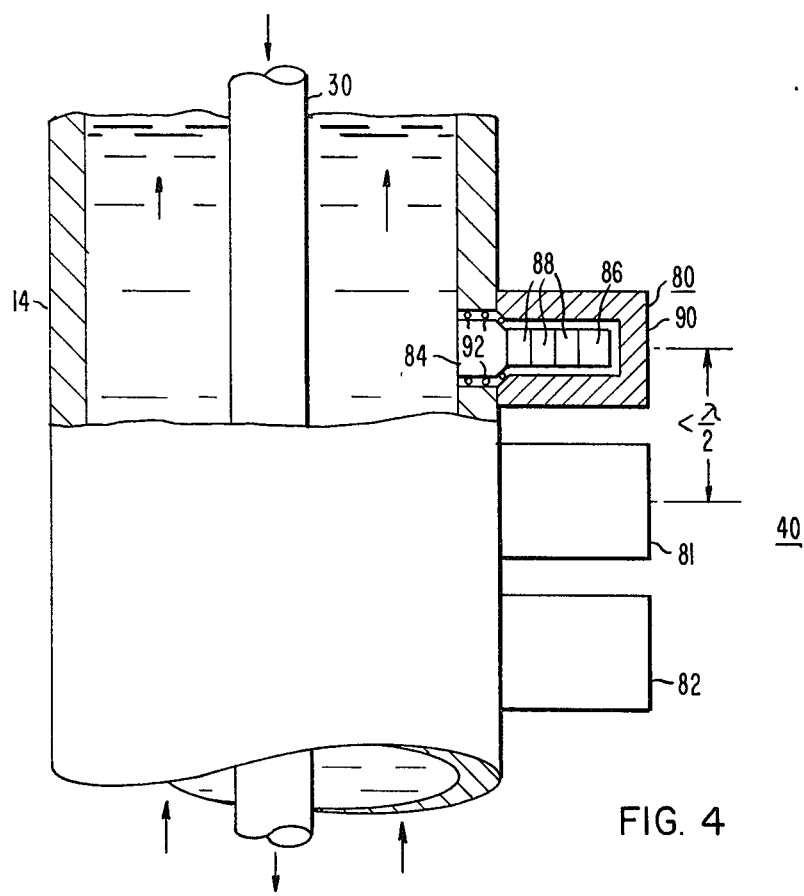
FIG. 4 is a view, partially in section, with portions broken away, illustrating the mounting of transducer means.

The transducer means for introducing the acoustic signal into the drilling fluid must be flush with the interior of the riser wall or, alternatively, must transmit through the wall. FIG. 4 illustrates an arrangement wherein the transducer means actually contacts the drilling fluid within the riser 14, the flow of drilling fluid being indicated by the arrows. By way of example, the transducer means 40 includes a plurality of individual transducers 80 to 82 vertically arranged along the riser 14 at a distance less than one-half wavelength of the acoustic signal in the drilling fluid. Each transducer may be of the Tonpilz variety which includes a radiating head member 84, a reaction tail mass 86 and an active unit 88 therebetween. Cover member 90 secures the unit to riser wall 14 and the transducer includes a plurality of O-rings 92 to effect a fluid seal. When utilizing a plurality of individual transducers vertically arrayed, the transducers may be relatively phased as to cause a downward and upward end fire beam, as is commonly done in the sonar art. Single transducers may also be used as well as a plurality of transducers arranged circumferentially around the riser, all driven in phase.

The frequency, or frequency band of the acoustic signal, is selected so as to be different from the hoop modes of vibration of the riser or casings. The hoop mode of vibration of a pipe refers to the acoustic energy produced by the pipe due to radial expansion and contraction. Since the largest pipe would produce the lowest frequency hoop mode of vibration, the transducer means and signal generator are chosen to preferably have the operation frequency below such hoop mode frequency since the smaller diameter casings would have higher hoop mode frequencies.

We claim:

1. Apparatus for detecting a kick during the drilling of a well utilizing drill pipe extending down through a larger diameter conduit and wherein drilling fluid is circulated down the drill pipe and up the annulus around the drill pipe, comprising:
   (A) transducer means connected to said conduit and being in acoustic communication with said drilling fluid in said annulus;
   (B) means for energizing said transducer means to propagate acoustic signals through said drilling fluid down said annulus;
   (C) means for receiving reflected acoustic energy propagated back through said drilling fluid; and
   (D) means for displaying at least the reflection of acoustic energy from the vicinity of the bottom of the hole being drilled and for displaying the reflection of acoustic energy from the interface between said drilling fluid and a kicking medium.

2. Apparatus according to claim 1 wherein:
   (A) said conduit is a marine riser having a slip joint; and
   (B) said transducer means is positioned below said slip joint.

3. Apparatus according to claim 2 wherein:
 (A) said means for displaying additionally displays reflections of acoustic energy from said slip joint.
4. Apparatus according to claim 1 wherein:
 (A) said transducer means includes a plurality of individual transducers.
5. Apparatus according to claim 4 wherein:
 (A) said transducers are vertically arranged on said conduit at a transducer spacing of $<\lambda/2$ where $\lambda$ is the wavelength of the acoustic signals in said drilling fluid.
6. Apparatus according to claim 1 wherein:
 (A) said transducer means is additionally operable to receive said reflected acoustic energy propagated back through said drilling fluid to provide signals for display.
7. Apparatus according to claim 1 wherein:
 (A) said conduit may vibrate at a certain hoop mode frequency; and wherein
 (B) the operating frequency of said transducer means is below said hoop mode frequency.

* * * * *